United States Patent
Sobottka

(10) Patent No.: US 12,070,727 B2
(45) Date of Patent: Aug. 27, 2024

(54) DEVICE AND METHOD FOR MIXING THE CONTENTS OF A TANK

(71) Applicant: GEA Brewery Systems GmbH, Kitzingen (DE)

(72) Inventor: Uwe Sobottka, Kitzingen (DE)

(73) Assignee: GEA Brewery Systems GmbH, Kitzingen (DE)

( * ) Notice: Subject to any disclaimer, the term of this patent is extended or adjusted under 35 U.S.C. 154(b) by 1 day.

(21) Appl. No.: 17/934,707

(22) Filed: Sep. 23, 2022

(65) Prior Publication Data

US 2023/0008817 A1    Jan. 12, 2023

Related U.S. Application Data

(62) Division of application No. 16/332,827, filed as application No. PCT/EP2017/073130 on Sep. 14, 2017, now Pat. No. 11,484,849.

(30) Foreign Application Priority Data

Sep. 14, 2016  (DE) ................. 10 2016 217 500.9

(51) Int. Cl.
*B01F 23/00*  (2022.01)
*B01F 23/40*  (2022.01)
(Continued)

(52) U.S. Cl.
CPC .............. *B01F 23/45* (2022.01); *B01F 23/49* (2022.01); *B01F 23/56* (2022.01); *B01F 25/211* (2022.01); *B01F 25/53* (2022.01); *B01F 2101/15* (2022.01)

(58) Field of Classification Search
CPC ...... B01F 2101/15; B01F 23/45; B01F 25/30; B01F 25/211
See application file for complete search history.

(56) References Cited

U.S. PATENT DOCUMENTS 923,571 A * 6/1908 Paterson
2013/0224358 A1 * 8/2013 Michel ................. C12C 13/00
366/137

(Continued)

FOREIGN PATENT DOCUMENTS

WO   2011147958 A1   12/2011
WO   2017067885 A1   4/2017

OTHER PUBLICATIONS

International Search Report and Written Opinion of the International Searching Authority for corresponding International Patent Application No. PCT/EP2017/073130, dated Dec. 8, 2017.

(Continued)

*Primary Examiner* — Anshu Bhatia
(74) *Attorney, Agent, or Firm* — Renner, Otto, Boisselle & Sklar, LLP

(57) ABSTRACT

Device for mixing the contents of a tank comprising a first pipe connecting body arranged on a connecting flange of a tank; a riser pipe extending through the first pipe connecting body into the tank; a mixing pipe extending through said first pipe connecting body into said tank; and a pump whose outlet can be connected at least to the mixing pipe and whose inlet can be connected both to the first pipe connecting body and to the riser pipe. Further a method for mixing the contents of a tank is claimed.

15 Claims, 4 Drawing Sheets

Figure 1:
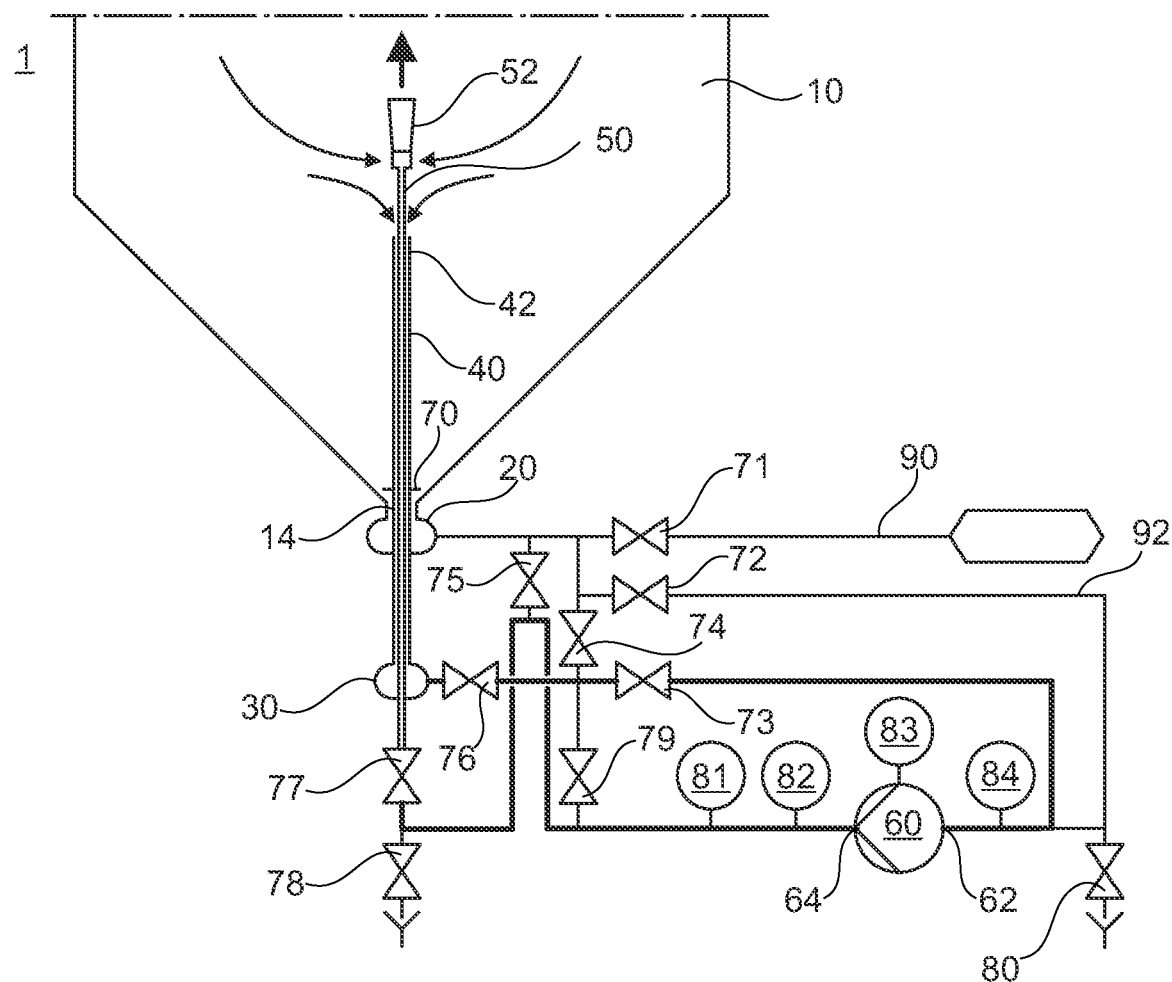

(51) Int. Cl.
*B01F 23/45* (2022.01)
*B01F 23/50* (2022.01)
*B01F 25/21* (2022.01)
*B01F 25/53* (2022.01)
*B01F 101/15* (2022.01)

(56) References Cited

U.S. PATENT DOCUMENTS

2014/0251797 A1* 9/2014 Herkle .................. B01F 25/211
 204/273
2018/0320124 A1 11/2018 Müller-Auffermann

OTHER PUBLICATIONS

Extended European Search Report issued for corresponding EP Application No. 21205882.0, dated Feb. 23, 2022.

\* cited by examiner

DEVICE AND METHOD FOR MIXING THE CONTENTS OF A TANK

1. RELATED APPLICATION

This application is a divisional of U.S. patent application Ser. No. 16/332,827, filed Mar. 13, 2019; which is a national phase of International Application No. PCT/EP2017/073130 filed Sep. 14, 2017, and published in German under International Publication No. WO2017067885A1 on Mar. 22, 2018; which claims priority of German Application No. 10 2016 217 500.9 filed Sep. 14, 2016, each of which is incorporated herein by reference.

2. TECHNICAL FIELD

The invention concerns a device and a method for mixing the contents of a tank, particularly in the food, beverage and pharmaceutical industries.

3. PRIOR ART

In the beverage industry it is well known to place nozzle devices inside a tank to mix the contents of a tank and to pump quantities of the contents of the tank through the nozzle. This creates a flow within the tank which mixes the contents of the tank.

WO 2011/147958 A1 discloses a method for accelerated fermentation and a device for mixing tank contents. The device comprises a jet pump arranged at a certain height in the lower part of a fermentation tank to mix the contents of the tank. For mixing, the tank contents are withdrawn at the tank outlet and fed to the jet pump as a propellant by means of a pump. In the jet pump, a quantity of tank contents is sucked in by the propellant, mixed with the propellant and injected upwards into the tank, where a further mixing of the tank contents takes place.

The device of the WO 2011/147958 A1 is therefore well able to mix the contents of a tank and to keep fermentation yeast in a fermentation tank suspended during beer production. However, this mixing must be stopped if the tank is to be emptied.

In cold hopping, the so-called "dry hopping", hops is added to a tank with a beer or a beer precursor. The aim is to dissolve special aroma components from hops in beer or in the beer precursor. Ideally, the hops should be finely distributed within the beer to produce a large surface area and good mass transfer. The hops product used for dry hopping is usually provided in the form of hops pellets, i.e. ground and pelletized hop cones. Such hops pellets decompose on contact with liquid into a crumbly structure with particle sizes in the range of about 100-3000 µm. The suspension of hops particles must be maintained for a certain period during dry hopping, with the hops showing a tendency to sedimentation. It is therefore necessary to mix the tank contents as well as possible during dry hopping. Since the hops particles should not sediment even during the discharge of the tank contents, which can take a considerable time with the usual large tanks, the mixing should also be maintained during the discharge, which is not possible with prior art mixing devices. The drained suspension "hops in beer" should have only a small solids concentration so that the hops particles can then be filtered out of the suspension by means of a centrifuge or a separator without great loss of beer.

It is therefore the task of the present invention to provide a device and a method for mixing the contents of a tank, which easily ensures mixing of the contents of the tank under different process conditions. For example, mixing should be ensured during the processing time within the tank, after a preceding sedimentation phase, during a partial sedimentation phase and also when the tank is discharged.

4. SUMMARY OF THE INVENTION

The above tasks are solved by a device for mixing a tank content according to patent claim 1 and by a method for mixing a tank content according to patent claim 12.

The above-mentioned tasks are in particular solved by a device for mixing the contents of a tank comprising a first pipe connecting body arranged on a connecting flange of a tank, a riser pipe extending through the first pipe connecting body into the tank, a mixing pipe extending through the first pipe connecting body into the tank and a pump, whose outlet can be connected at least to the mixing pipe and whose inlet can be connected both to the first pipe connecting body and to the riser pipe. A pipe connecting body is any type of connecting element for a pipe with a tank. These can be e.g. so-called Varivent connection elements, but also pipe bends, T-pieces or similar elements.

This allows the device to be used flexibly and allows the tank contents to be withdrawn for mixing either from the first pipe connecting body or from the riser pipe and fed to a mixing nozzle located inside the tank by means of a pump. Since the inlet of the pump can also be connected to the riser pipe, it is possible to mix the tank contents simultaneously while the tank is being drained via the pipe connecting body. On the other hand, the fact that the inlet of the pump can be connected to the pipe connecting body also enables complete mixing of the tank contents, since in this case the tank contents are withdrawn at the lowest point of the tank for mixing. In addition, by connecting the riser pipe to the inlet of the pump, it is also possible to mix the tank contents if part of the tank contents is to sediment intentionally at the same time or prior to this and this part is no longer to be swirled up or mixed. This device can therefore be used in a wide variety of operating modes, such as mixing during discharge or mixing after or during sedimentation of part of the tank contents. The device therefore enables new processing and mixing techniques which can be used in dry hopping in beer production.

Preferably, the outlet of the pump can also be connected to the first pipe connecting body if the inlet of the pump is connected to the riser pipe. This connection option makes it possible to loosen or dilute sediment that has accumulated after a sedimentation step at the deepest point of the tank, particularly in the area of the pipe connecting body, so that it can be removed more easily afterwards, for example. This also makes it possible to dilute sediment again to such an extent that the tank contents can subsequently be completely or partially mixed via the mixing pipe or a mixing nozzle without there being any risk of clogging of the mixing pipe and the mixing nozzle. Already sedimented solids can therefore be mixed completely or partially with the remaining tank contents.

Preferably, the outlet of the pump can also be connected to the riser pipe if the inlet of the pump is connected to the first pipe connecting body. This connection option allows, for example, a gentle partial mixing of the lower tank contents without using the mixing pipe, which has a strong mixing effect on the tank contents. This solution can also be used if large volume flows are to be circulated within the tank. This is necessary, for example, if a heat exchanger is installed in the pipe between the first pipe connecting body and the riser pipe. Since the cooling of tanks usually has to be performed quickly, high mass flows have to be cooled. In most cases, these cannot be routed via the mixing pipe, as the dimensions of the mixing pipe may not be sufficient. The same applies of course to heating processes.

Preferably, the mixing pipe runs inside the riser pipe, further preferably concentrically inside the riser pipe. This makes it possible to connect the mixing device to an ordinary connecting flange of a tank, in particular a cylindroconical tank (CCT), without structurally changing the tank itself. This means that every CCT can be equipped or retrofitted with a mixing device according to the invention in a simple and reversible manner. The description explains the invention by means of a CCT. However, it can also be used for tanks with any other bottoms, e.g. dished bottoms or flat bottoms. When reference is made to a connection flange, reference is also made to welded connections.

Preferably, the riser pipe extends essentially vertical upwards into the tank and/or has an open end. This allows the riser pipe to be used for suction of tank contents at an elevated liquid level. On the other hand, the riser pipe can also be used as an outlet at an elevated liquid level for mixing tank contents.

Preferably, the device also comprises a deflection plate attached to the riser pipe above the first pipe connecting body. Sediment is thus better stirred up and diluted when the tank content, which was withdrawn via the riser pipe, is again introduced into the tank via the pipe connecting body.

Preferably, a mixing nozzle is connected to the upper end of the mixing pipe. The mixing nozzle can be used to shape the jet of the tank contents introduced into the tank in order to achieve better mixing of the tank contents.

Preferably, the mixing nozzle is a jet pump which is adapted to draw tank contents out of the tank and mix them with tank contents which are pumped via the mixing pipe to the mixing nozzle. This allows the mixing nozzle not only to inject the tank contents pumped to it into the tank, but also to mix them with other tank contents, which are sucked in by the mixing nozzle itself. Thus, a very intensive mixing of the tank contents is possible.

Preferably, the mixing pipe can further be used to withdraw tank contents. If the mixing nozzle or jet pump is left out and the end of the mixing pipe protrudes into the tank without attachments, this can also be an advantage. Then, the mixing pipe can also be used to withdraw the tank contents. This tank contents can then be returned to the tank via the riser pipe and/or the first pipe connecting body, or the tank contents can be discharged from the tank in this way. This then allows the introduction and/or withdrawal of tank contents at a further level into the tank. For the first time, this allows even greater flexibility when using a tank for beer preparation.

Preferably, the lower end of the riser pipe is connected to a second pipe connecting body. This allows the riser pipe to be integrated into the liquid circuit via standardised means.

Preferably, the riser pipe is shorter than the mixing pipe. Thus the upper end of the mixing pipe or the mixing nozzle within the tank is arranged at a higher level compared to the end of the riser pipe. This provides different mixing types, depending on whether the riser pipe or the mixing nozzle is used as an outlet.

Preferably, the riser pipe extends at least by a length of 0.5 m, or preferably by at least a length of 1 m, or preferably by at least a length of 1.5 m into the tank, measured from the connecting flange.

Preferably, the mixing pipe, preferably including the mixing nozzle, extends into the tank by a length of at least 0.7 m, or preferably by a length of at least 1.2 m, or preferably by a length of at least 1.7 m, measured from the connecting flange. These lengths of riser pipe and mixing pipe, including mixing nozzle if necessary, are particularly advantageous when mixing hops particles or yeast cells in a fermentation tank during beer production. The lengths can depend on the tank size and the tank geometry.

Preferably, the first pipe connecting body is further connected to an inlet and outlet line for filling and emptying the tank. This allows the tank to be filled and emptied via the first pipe connecting body, especially if the tank contents are mixed at the same time. However, this inlet and outlet line does not necessarily have to be connected directly to the pipe connecting body.

An indirect connection is also possible. Inlet and outlet lines can also be combined or can be separated from each other.

The above tasks are also solved by a method for mixing the contents of a tank, comprising the following steps:
 a. Arranging a riser pipe extending through a first pipe connecting body on the connecting flange into the tank;
 b. Withdrawing the tank contents either via the riser pipe or via the first pipe connecting body arranged on an outlet flange of the tank;
 c. Pumping the tank contents withdrawn via the riser pipe or via the first pipe connecting body by means of a pump;
 d. Connecting the outlet of the pump so that both the tank contents withdrawn via the riser pipe or the first pipe connecting body can be introduced into the tank via a mixing pipe extending through the first pipe connecting body into the tank and the tank contents withdrawn via the riser pipe can be introduced into the tank via the first pipe connecting body; and
 e. Introducing the withdrawn tank contents into the tank and mixing the withdrawn tank contents with the remaining tank contents.

This method makes it possible to return the tank contents withdrawn from the tank to the tank via the mixing pipe as well as via the first pipe connecting body. The tank contents can be mixed when introduced via the mixing pipe and sedimentation of solids can be completely or partially prevented. Partial sedimentation is possible if the tank contents are withdrawn via the riser pipe and fed back via the mixing pipe. Complete mixing, on the other hand, occurs when the tank contents are withdrawn via the first pipe connecting body and fed back via the mixing pipe. Furthermore, sediment accumulated in the lower area of the tank can be diluted or whirled up again and mixed if the tank contents are withdrawn via the riser pipe or the mixing pipe and introduced via the first pipe connecting body. The method according to the invention therefore allows the flexible use of the mixing device for different mixing tasks. In particular, the process can also be used to carry out new processing, mixing or sedimentation processes, which can be advantageously used in dry hopping for beer production, although the method is not limited to such application.

Preferably, the method comprises the step of draining tank contents from the tank via the first pipe connecting body, if in step b. the tank contents are withdrawn via the riser pipe, whereby draining and mixing take place simultaneously. This simultaneous mixing and draining prevents sedimentation within the tank during the draining process. This ensures a homogeneous suspension of solids in the drained liquid, as is necessary, for example, for the removal of hops particles by a centrifuge or a separator during dry hopping.

Preferably, the method further comprises the step of swirling up the sediment of the tank contents if in step b. the tank contents are withdrawn via the riser pipe and the outlet of the pump is connected to the first pipe connecting body. This allows sediments accumulated in the lower part of the tank to be specifically swirled up or diluted in order to drain them better or to mix them again with the contents of the tank.

Preferably, the method is uses for dry hopping, where the tank is a fermentation tank and the tank contents contain hops particles. The method can be used particularly advantageously for dry hopping in beer production, in particular for homogenizing the hops particles in the liquid even during the time-consuming draining process.

5. SHORT DESCRIPTION OF THE DRAWINGS

Figure 2:
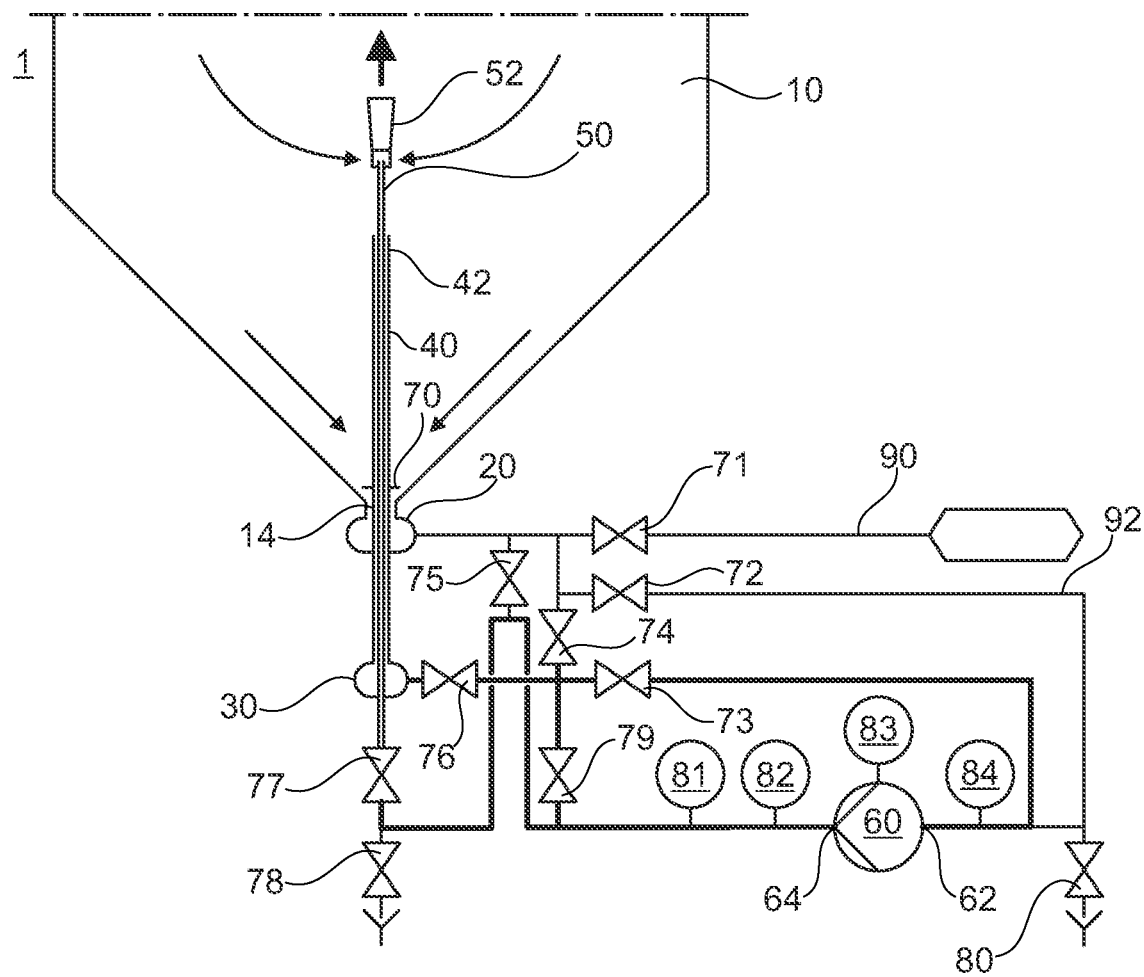
Figure 3:
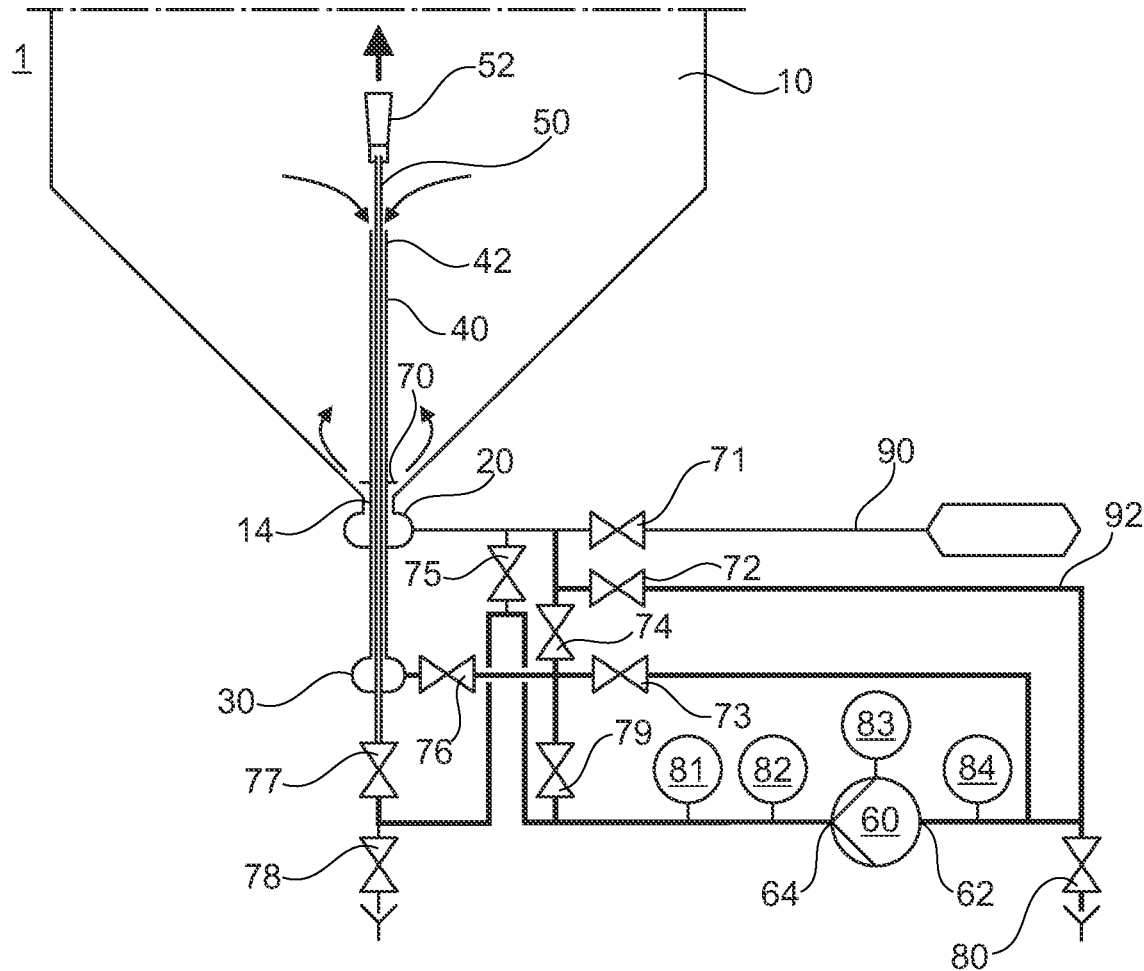
Figure 5:
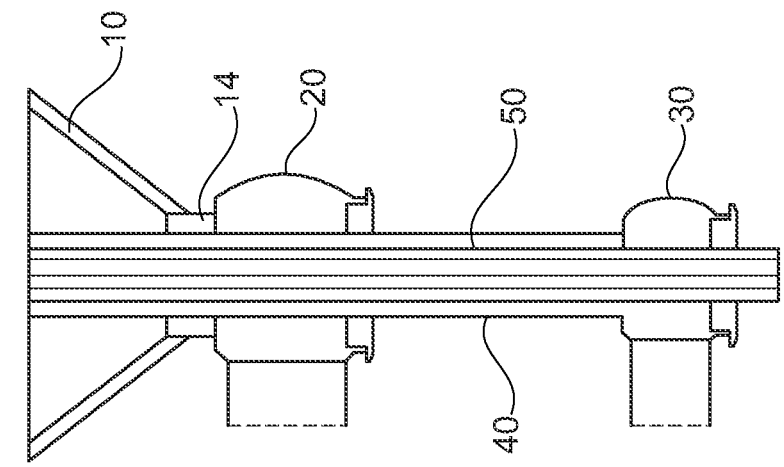
Figure 4:
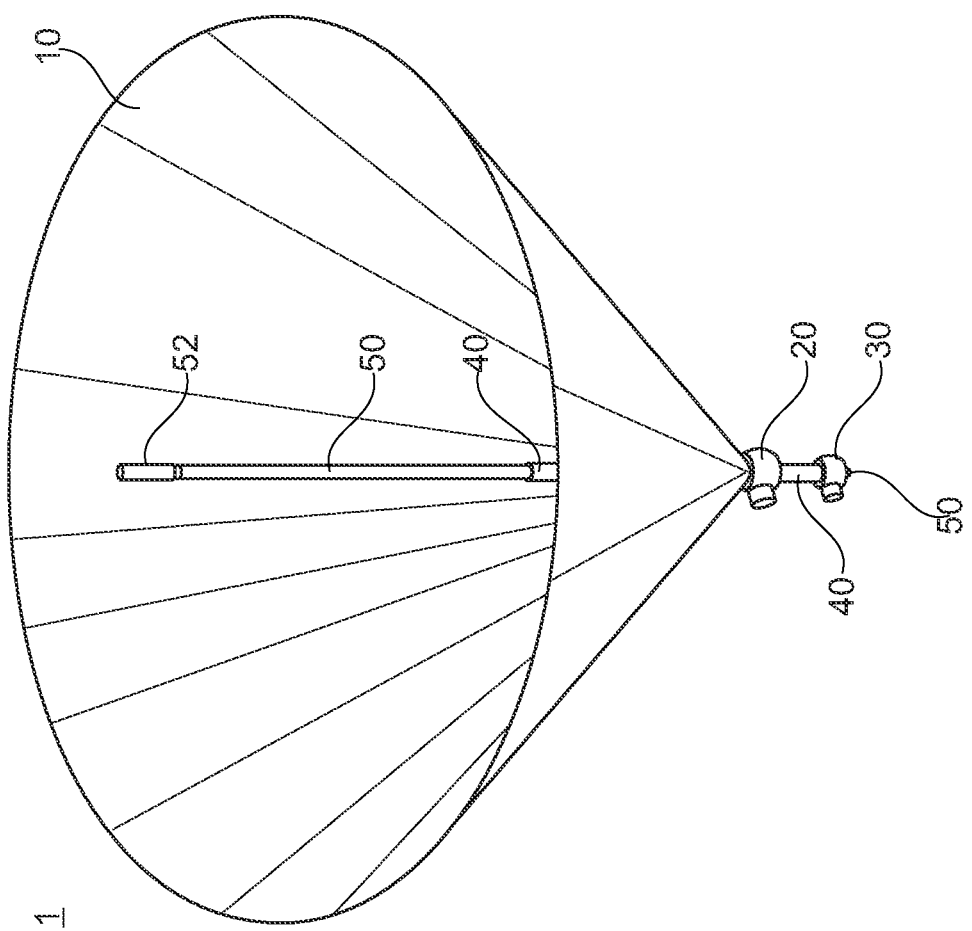

In the following preferred embodiments of the invention are described with reference to the drawings, wherein:

FIG. 1: shows a sectional side view of a lower portion of a cylindroconical tank having an embodiment of a device for mixing the tank contents and a schematic representation of further components of the device in an operating mode for mixing the tank contents;

FIG. 2: shows the device according to FIG. 1 in another operating mode during mixing the tank contents;

FIG. 3: shows the device according to FIG. 1 in another operating mode during diluting or whirling up sediment;

FIG. 4: shows a three-dimensional partial view of a lower region of a cylindroconical tank having an embodiment of a device for mixing the contents of the tank; and FIG. 5: shows a cut side view of the lower part of the tank of FIG. 4, with parts of the device for mixing the tank contents in detail.

6. DESCRIPTION OF PREFERRED EMBODIMENTS

In the following, preferred embodiments of the invention are described in detail with reference to the drawings.

FIG. 1 shows a lower part of a cylindroconical tank (CCT) 10 as used, for example, as a fermentation and/or storage tank of a brewery with a device 1 for mixing tank contents. At the lower conical outlet area of the tank 10 a connection flange 14 is located to which a first pipe connecting body 20 is connected. The tank 10 can be filled and emptied via a main pipe 90 which is connected to the tank 10 at this first pipe connecting body 20. The connection flange 14 preferably has a nominal diameter DN of 100 mm or larger.

As further parts of the device 1, a riser pipe 40 extends through the connecting flange 14 into the tank 10. The riser pipe 40 is essentially aligned vertically and penetrates the opening of the connection flange 14 preferably coaxially. The nominal diameter DN of the riser pipe is preferably 65 mm. Via the riser pipe 40, the tank contents can be withdrawn from tank 10 at a certain height or introduced into tank 10. At the lower end of the riser pipe 40, it is connected to a second pipe connecting body 30, which hydraulically connects the riser pipe 40 to the other parts of device 1.

In addition, a mixing pipe 50 extends through the connection flange 14 into the tank. The mixing pipe 50 runs essentially coaxially inside the riser pipe 40 and is also vertically aligned. The upper end of the mixing pipe 50 can be open, or a mixing nozzle 52 can be connected to it. The mixing nozzle 52 is preferably a jet pump 52, which itself can suck the contents of the tank from tank 10 and mix them with the propellant, which is fed to it through the mixing pipe 50. If no mixing nozzle 52 is installed on the mixing pipe 50, the mixing pipe 50 can also be used to suck in tank contents.

The device 1 further comprises a pump 60 which can be connected in different ways to the first pipe connecting body 20, to the riser pipe 40 and to the mixing pipe 50 by means of piping 92 and valves 71-80. Due to the different interconnection options, different operating states of the device for mixing, sedimentation and cleaning (Cleaning In Place, CIP) can be set.

For filling or emptying the tank without simultaneous mixing, valve 71 is open and all other valves are closed.

To mix the tank contents in a first operating mode, as shown in FIG. 1, the valves 73, 76 and 77 are open and the other valves are closed. The inlet 62 of the pump 60 is thus connected to the riser pipe 40 via the second pipe connecting body 30. The outlet 64 of the pump 60 is connected to the lower end of the mixing pipe 50. Thus the tank content is withdrawn via the riser pipe 40 and fed to the pump 60. The pump 60 is in operation and pumps the withdrawn tank contents to the mixing pipe 50, which introduces the tank contents at a raised position into the tank 10 and thus ensures mixing of the tank contents. Depending on the power of the pump 60, partial sedimentation can also be achieved in the area below the upper end 42 of the riser pipe 40. The power of the pump 60 can be controlled by a speed control 83 of the pump 60.

The mixing of the first operating mode can also be carried out during the discharge of tank contents from tank 10. In this case the pump 60 is in operation and the valves 71, 73, 76 and 77 are open and the other valves are closed. This ensures a homogeneous distribution of suspended particles in the liquid even during discharge. This operating mode can also be carried out when filling the tank in order to mix the tank contents during filling.

In another operating mode shown in FIG. 2, valves 72 and 77 are open, the other valves are closed and the pump is in operation. Thus, the inlet 62 of pump 60 is connected to the first pipe connecting body 20 and the outlet 64 of pump 60 is connected to the mixing pipe 50. In this operating mode, the tank contents are therefore withdrawn at the lowest point of tank 10 and fed back to the tank via mixing pipe 50 or a mixing nozzle 52 connected to it. This results in optimum mixing of the entire tank contents of the tank 10.

In another operating mode shown in FIG. 3 the valves 73, 75 and 76 are open, the other valves are closed and the pump 60 is in operation. The inlet 62 of pump 60 is thus connected to riser pipe 40 and the outlet 64 of pump 60 is connected to the first pipe connecting body 20. In this mode, sediment deposited in the lower part of tank 10 can be whirled up or diluted so that it can subsequently be better removed from tank 10 or remixed with the tank contents. To improve the turbulence of the sediment, a deflection plate 70 is attached to the riser pipe 40 just above the first pipe connecting body 20. This swirls the flow of tank contents coming from the pipe connecting body 20 so that the sediment is better captured.

In another operating mode (not shown) the valves 72, 76 and 79 are open, the other valves are closed and the pump 60 is in operation. Thus, the inlet 62 of pump 60 is connected to the first pipe connecting body 20 and the outlet 64 of pump 60 is connected to the riser pipe 40. In this operating mode, the withdrawn tank contents are introduced via the riser pipe 40 and thus at a lower level than via the mixing pipe 50 or the mixing nozzle 52. In this operating mode, mixing can therefore be carried out more gently than via the mixing nozzle 52. This operating mode can also be used for a cooling process, for example, since large mass flows are required therefore. These mass flows may no longer be conveyed through the mixing pipe 50 but must be introduced into the tank via the riser pipe 40. A necessary heat exchanger (not shown) is then variably integrated into any pipe outside the tank. One conceivable location, for example, would be between pump 60 and valve 79.

Altogether, the inventive device 1 can be used to connect the most varied operating modes, so that device 1 can be used for the most varied mixing and sedimentation applications, particularly in the beverage and food industries. Device 1 or the process carried out with it can preferably be used in the different operating modes for dry hopping in a beer brewing process.

The device is also suitable for Cleaning In Place (CIP). For CIP of mixing pipe 50 and mixing nozzle 52, valves 72, 73, 74 and 77 are open and the other valves are closed. Pump 60 is in operation at CIP.

For CIP the riser pipe 40, valves 72, 76 and 79 are open, the other valves are closed and the pump 60 is in operation.

For CIP of valve 75, valves 72, 73, 74 and 75 are open, the other valves are closed and pump 60 is in operation.

To drain the CIP liquid from device 1 and from tank 10, all valves 71-80 are open and pump 60 is not operating.

Device 1 also has measuring instruments 81, 82 and 84, such as volume and/or mass flowmeters, temperature meters, pH meters, pressure gauges, turbidity and/or colorimeters or other measuring instruments for the beverage industry. The exact number and arrangement of measuring instruments is arbitrary.

The invention claimed is:

1. A method of mixing contents of a tank comprising the following steps:
    a. arranging a riser pipe extending through a first pipe connecting body on a connecting flange into the tank;
    b. arranging a mixing pipe extending through the first pipe connecting body into the tank;
    c. withdrawing tank contents via the riser pipe;
    d. pumping the tank contents withdrawn via the riser pipe by means of a pump; and
    e. introducing the withdrawn tank contents into the tank and mixing the withdrawn tank contents with the remaining tank contents by means of the mixing pipe.

2. The method according to claim 1, further comprising a step of: f. introducing the tank contents withdrawn via the riser pipe into the tank via the first pipe connection body, wherein sediment of the tank contents is swirled up.

3. The method according to claim 2, further comprising a step of: g. draining tank contents from the tank via the first pipe connection body, wherein draining and mixing take place simultaneously.

4. The method according to claim 3, wherein sedimentation in the tank is prevented during the draining process.

5. The method according to claim 3, wherein the step g. draining tank contents from the tank via the first pipe connection body, is performed after the step f. introducing the tank contents withdrawn via the riser pipe into the tank via the first pipe connection body.

6. The method according to claim 1, wherein the outlet of the pump can be interconnected such that introduction of the tank contents withdrawn via the riser pipe into the tank is possible both via the mixing pipe and via the first pipe connection body.

7. The method according to claim 1, further comprising the step of: swirling up sediment of the tank contents, wherein the outlet of the pump is connected to the first pipe connection body.

8. The method according to claim 1, wherein the wherein the riser pipe is shorter than the mixing pipe.

9. The method according to claim 1, wherein the mixing pipe runs within the riser pipe, preferably concentrically within the riser pipe.

10. The method according to claim 1, wherein the riser pipe extends substantially vertically upwards into the tank and/or has an open end.

11. The method according to claim 10, wherein at the upper end of the mixing pipe a mixing nozzle is connected.

12. The method according to claim 11, wherein the mixing nozzle is a jet pump which is configured to withdraw tank contents from the tank and mix them with tank contents which are pumped via the mixing pipe to the mixing nozzle.

13. The method according to claim 1, wherein the lower end of the riser pipe is connected to a second pipe connecting body.

14. The method according to claim 1, further comprising the step of: withdrawing tank contents via the mixing pipe.

15. The method according to claim 1, wherein the method is used for dry hopping, and wherein the tank is a fermentation tank and the tank contents comprise hop particles.

* * * * *